Aug. 28, 1962 H. K. M. VERHOEVEN 3,050,917
OPENING DEVICE FOR DOCUMENT CARRIERS
Filed June 19, 1959 2 Sheets-Sheet 1

Inventor
H. K. VERHOEVEN

Agent

Aug. 28, 1962 H. K. M. VERHOEVEN 3,050,917
OPENING DEVICE FOR DOCUMENT CARRIERS
Filed June 19, 1959 2 Sheets-Sheet 2

*Inventor*
H.K. VERHOEVEN
By
Agent 3,050,917
OPENING DEVICE FOR DOCUMENT CARRIERS
Herman K. M. Verhoeven, Antwerp, Belgium, assignor to International Standard Electric Corporation, New York, N.Y., a corporation of Delaware
Filed June 19, 1959, Ser. No. 821,421
Claims priority, application Belgium June 21, 1958
5 Claims. (Cl. 53—381)

The invention relates to an opening device for document carriers used in the automatic processing of documents, and more particularly to document carriers of the type described in our Belgian Patent No. 544,840.

A mechanism accomplishing this function has been described in Belgian Patent No. 577,764. To open document carriers, this mechanism uses pneumatic devices fixed on movable arms able to be spread apart under the combined action of a set of levers and cams. These devices are connected, by means of flexible pipes, to a suction pump. This mechanism is relatively complicated, cumbersome and expensive.

The general object of the present invention is to realize the opening of document carriers such as cited above by much simpler means while maintaining the same high operating safety. More particularly, an object of the invention is to realize the opening of the document carriers by means of a device avoiding any movable part.

According to a feature of the invention, the device is constituted by two plates of rigid material, of elongated shape arranged at a certain distance one from the other according to substantially parallel longitudinal directions, in planes the prolongations of which intersect on the side of the course of the document carriers, and at a distance somewhat smaller than the height of a document carrier, the front ends of said plates being slightly curved one towards the other so as to be joined together and to form an angle the edge of which is located outside the plane in which the document carriers are displaced, the plate which is on the same side as said edge with respect to the plane of displacement of the document carriers being extended forward by a certain amount over a half of its height beyond said edge so that the end of this extension is located in a plane opposite to said edge with respect to the plane of displacement of the document carriers, and the assembly of said plates and of said extension being so arranged, with respect to the course of the document carriers, that when a document carrier follows said course, said extension only comes into contact with the edge of the highest flap of the document carrier which is thus drawn to one side while the less high flap is drawn to the other side by one of the sides of said angle.

According to another feature of the invention, a loading mechanism, located above said device, propels at a certain speed, the document to be introduced in the document carrier, so that said document drops down to the bottom of the document carrier.

The objects and features of the invention described above as well as others and the way to attain them will become more apparent and the invention itself will be best understood by referring to the following description of an embodiment of the invention taken in conjunction with the accompanying drawings in which.

Figure 1:
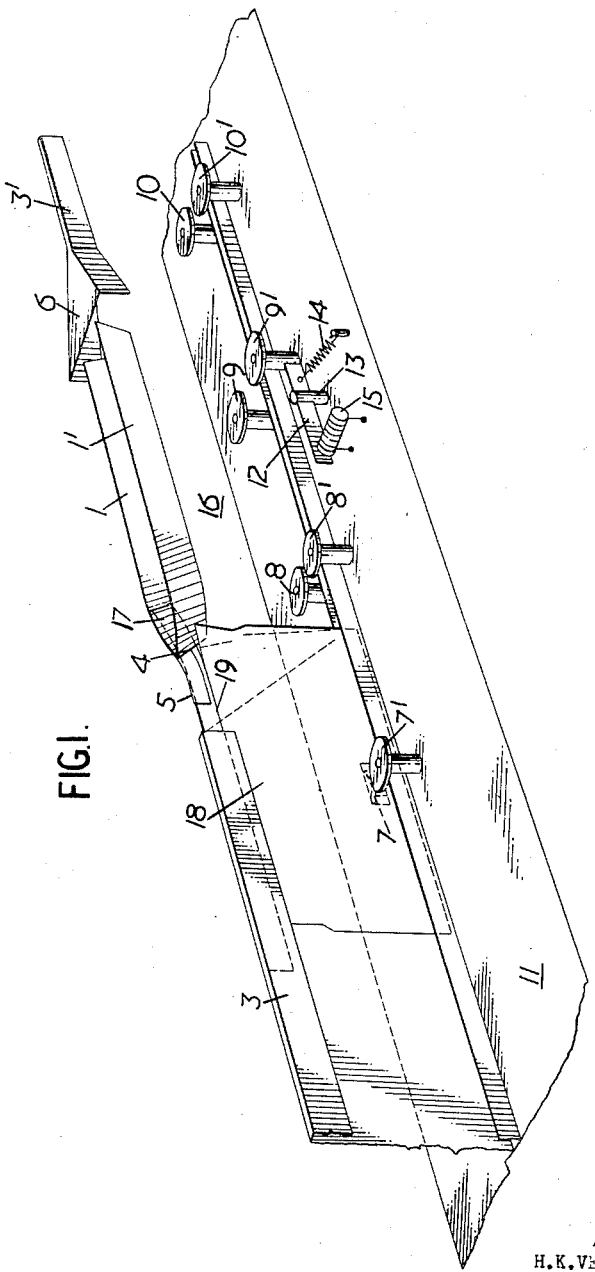
FIG. 1 is a schematic perspective view of the device according to the invention associated to the mechanism making the document carriers advance to the place where said device is located and beyond the latter after introduction of a document in the document carrier.
Figure 3:
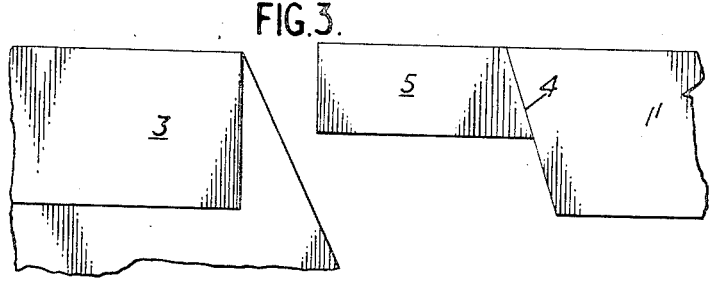
FIG. 3 is a side view of the parts represented at FIG. 2.

The device according to the invention consists of two metal plates 1 and 1' located at a certain distance from each other substantially symmetrically on each side of the plane of groove 3—3' and in planes the prolongations of which reach the plane of groove 3 below the latter.

The front ends of plates 1 and 1' are curved towards each other so as to be joined together at 4 according to a shape reminiscent of the upper part of the stem of a boat, and one of said plates, for instance plate 1, is prolonged above junction 4 to form the first separator 5. The latter is so arranged that its end is situated in a plane beyond that of groove 3 with respect to plate 1, as shown on FIG. 2, and its height is only about half that of plates 1 and 1'; it comes into contact with the upper part of the larger flap of the document carrier protruding above the small flap.

Figure 2:
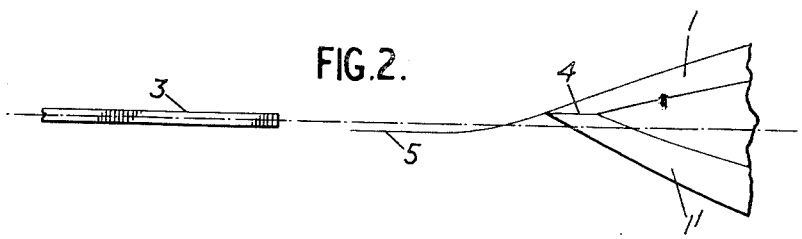
FIG. 2 is a plan view of the front end of the device according to the invention and of the part of the groove located immediately before this device and through which comes the document carrier.

On the other hand junction 4 of the two plates 1 and 1' is not in the plane of groove 3 but is slightly shifted with respect to the latter, to the side of plate 1 (FIG. 2).

Part 3' of the groove, which follows the opening device, is provided with a widened piece 6 serving to guide the document carrier inside of this groove, when it leaves the opening device after having received a document.

The displacement of the document carrier can be accomplished by any appropriate mechanism, for instance by a mechanism of the kind described in our patent application cited above. On FIG. 1, the displacement system of the document carrier, is schematically indicated by the driving pulleys their operating principle being as follows:

Pulleys 7, 8, 9 and 10 pivot permanently under the action of a mechanical transmission (not visible) being under the base plate 11. Pulleys 7', 8' and 10' are pressed in permanence respectively against pulleys 7, 8 and 10, while pulley 9 is supported at the end of the armature 12 of an electromagnet, which armature may pivot around axis 13 and is urged by spring 14 in the sense where pulley 9' is withdrawn from pulley 9. Solenoid 15, when it is energised, displaces pulley 9' towards pulley 9.

The operation of the assembly is as follows: when a document carrier is conveyed by an adjacent mechanism (not represented) in groove 3 so as to be seized between pulleys 7 and 7', the latter take it to pulleys 8 and 8' which continue the movement until the document carrier has arrived at the loading place 16. At this moment, the document carrier is between pulleys 9 and 9', but pulley 9' being removed, the document carrier stops at place 16.

During the displacement of the document carrier the latter is open in the following manner: the upper rim 17 of the large flap of document carrier 18 is deviated on the side of plate 1 by part 5, while the upper rim 19 of the small flap is not influenced by part 5 due to the fact that it is at a lower level than the lower edge of this part. On the other hand, this rim 19 will be deviated towards plate 1' by the lower front part of this plate due to the position of edge 4 with respect to the plane of groove 3 (position previously defined). When the document carrier stops at place 16, it will thus have its flaps spread on both sides of device 1—1' (see FIG. 4).

Figure 4:
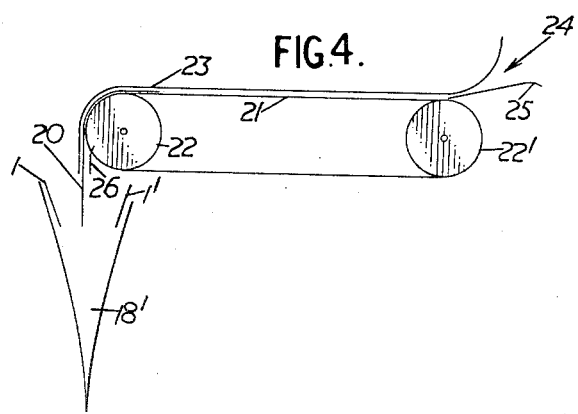
FIG. 4 is a schematic sectional view of the device introducing documents in document carriers opened by the device of FIGS. 1, 2 and 3.

At this moment another device, represented schematically on FIG. 4, drops a document such as 20 between plates 1 and 1', this document thus arrives finally between the flaps of the document-carrier. When after its loading, the document carrier has to continue its travel, an electrical current is sent in solenoid 15 by the electrical apparatus associated with the device herein described. Armature 12 is thus attracted towards solenoid 15 and displaces pulley 9' towards pulley 9. The document carrier is thus taken towards pulleys 10 and 10' which continue this displacement along groove 3' towards any suitable adjacent devices.

By leaving device 1—1' the document carrier again closes on its own due to its resiliency and is guided in groove 3' by part 6 as said above.

It is to be noted that plates 1 and 1' could be partly cut away or replaced by rods arranged where the lower edges of plates 1 and 1' are, if it is desired for instance to lighten or further simplify the device.

In order that the document really drops to the bottom of the document carrier, it is advantageous to introduce it provided with a certain descent speed. To do so, device 1—1' is surmounted by a loading device as represented schematically on FIG. 4. This loading device consists of a plurality of belts such as 21 each rolling on a pair of pulleys such as 22 and 22'. These belts are energised by a continuous movement under the action of a driving force (not represented) either applied to the axis of the pulleys such as 22, or to the axis of the pulleys such as 22'.

The upper horizontal part of these belts is covered by a smooth metal plate 23 of which the end above pulleys 22 is bent according to a circular arc of nearly 90° concentrically to pulleys 22; the other end of plate 23 being substantially above pulleys 22', is lifted as shown on FIG. 4 and a second flap 25 is fixed to this lifted part so as to form a widened input for the documents. When a document has to be introduced in a document carrier, it is deposited according to arrow 24 and when its lower edge comes into contact with belts 21, which are of relatively adherent material, it is pressed between the latter and the horizontal part of flap 23 and it is taken towards the other end of plate 23 where it has to follow the curved shape of this plate and fall inside the document carrier, as represented by 20 of FIG. 4. A part 26 shaped as a large-tooth comb is arranged parallel to the vertical part of the end of plate 23 as indicated on FIG. 4 and has for object to compel the document to separate from the belts in case the former would accidentally continue to adhere to the belts beyond the sector of 90° determined by the curved part of plate 23. To ensure this function, the teeth of part 26 extend between the various pulleys 22, as shown in profile on FIG. 4.

A secondary object of the device of FIG. 4 is to convey the document from the place accessible to the operator's hand (arrow 24) to the place where the opening device 1—1' is located.

Plate 23 is removable with respect to belts 21, so as to be able to disengage a document which might remain jammed en-route. Also, the assembly of the loading device is removable with respect to device 1—1', so as to be able to manually interfere in case of incorrect behaviour of the document-carrier.

While the principles of the invention have been described above in connection with specific apparatus, it is to be clearly understood that this description is made only by way of example and not as a limitation on the scope of the invention.

I claim:

1. In a document carrier opening system for document carriers each having two side flaps of different heights, said side flaps being normally closed and displaceable from one another at both their top and side edges to define an opening therebetween, separating means for displacing the side flaps of said carriers to open said carriers, means associated with said separating means for inserting documents in said open carriers, edgewise conveying means for conveying the document carriers along a conveying path which includes said separating and closing means, said separating means comprising a first stationary deflecting member crossing the conveying path at an acute angle, and positioned above the top edge of the lower side flap but positioned to engage the top portion of the higher side flap to deflect it laterally, and a second stationary deflecting member crossing the conveying path at an acute angle and positioned to engage the top portion of the lower side flap between the side edges of said flaps to deflect it in the opposite direction to said first side flap deflection.

2. In apparatus for moving a document carrier along a predetermined path having starting and terminal ends, said carrier having a pair of flaps extending in planes substantially parallel to said path and normally being in substantially abutting, face-to-face engagement but being separable from each other along at least two edges of each flap, one of said flaps being longer than the other of said flaps in a direction extending transversely to said path and one of said edges of each flap extending transversely to said path, and said one flap and said other flap being movable respectively along first and second predetermined paths substantially parallel to said path of said carrier, separating means for separating said flaps at one portion of said path of said carrier to provide an opening into said carrier for receiving documents between said flaps, said separating means comprising a first stationary deflecting member extending across said first predetermined path at an acute angle and positioned out of said second predetermined path to engage and deflect said one flap and deflect it laterally of said first predetermined path, and a second stationary deflecting member extending across said second predetermined path at an acute angle and positioned to enter between said one edge of said one flap and said one edge of said other flap and to engage said other flap and deflect it laterally in a direction opposite to that in which said one flap is deflected by said first member.

3. The combination as claimed in claim 2 wherein portions of said deflecting members are positioned in side-by-side, spaced apart relation to provide an opening therebetween for receiving documents to be deposited in said carrier.

4. In apparatus for moving a document carrier along a predetermined path having starting and terminal ends, said carrier having a pair of flaps extending in planes substantially parallel to said path and normally being in substantially abutting, face-to-face engagement but being separable from each other along at least two edges of each flap, one of said flaps being longer than the other of said flaps in a direction extending transversely to said path and one of said edges of each flap extending transversely to said path, and said one flap and said other flap being movable respectively along first and second predetermined paths substantially parallel to said path of said carrier, separating means for separating said flaps at one portion of said path of said carrier to provide an opening into said carrier for receiving documents between said flaps, said separating means comprising a first stationary deflecting member extending across said first predetermined path at an acute angle and from a point at one side of said first predetermined path and nearer the terminal end than to the starting end of said first-mentioned path to a point at the opposite side of said first predetermined path which is nearer to said starting end than to said terminal end of said first-mentioned path, the portion of said member extending across and on said opposite side of said first predetermined path being out of said second predetermined path, whereby a portion of one flap is engageable and deflectable laterally by said first deflecting member without engagement of said other flap by said first deflecting member, and a second stationary deflecting member extending across said second predetermined path at an acute angle from a first point at said one side of said first predetermined path and nearer to said starting end than to said terminal end of said first-mentioned path to a second point at said opposite side of said first predetermined path and nearer to said terminal end than to said starting end of said first-mentioned path whereby said second deflecting member is engageable with said other flap for deflecting said other flap laterally with respect to said second predetermined path.

5. The combination as claimed in claim 4 wherein said first point is adjacent to the point at which said first member crosses said first predetermined path and intermediate said last-mentioned point and said terminal end and a portion of said first member at said one side of said first predetermined path is spaced from a portion of said second member at said opposite side of said first predetermined path to provide a document receiving opening therebetween.

References Cited in the file of this patent

UNITED STATES PATENTS

| | | |
|---|---|---|
| 964,077 | Williams et al. | July 12, 1910 |
| 1,172,824 | Newman | Feb. 22, 1916 |
| 1,305,390 | McCarthy | June 3, 1919 |
| 1,317,387 | Penney et al. | Sept. 30, 1919 |
| 1,960,959 | Sague | May 29, 1934 |
| 2,684,799 | Holstein | July 27, 1954 |
| 2,831,305 | Earls et al. | Apr. 22, 1958 |